June 6, 1933.  E. C. MacDONALD ET AL  1,912,587
TIRE CLAMP
Filed June 7, 1932
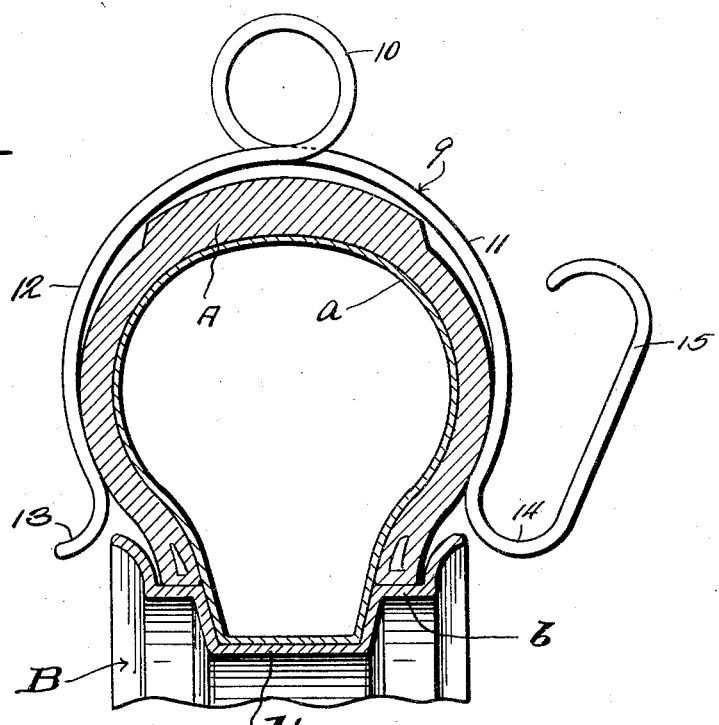
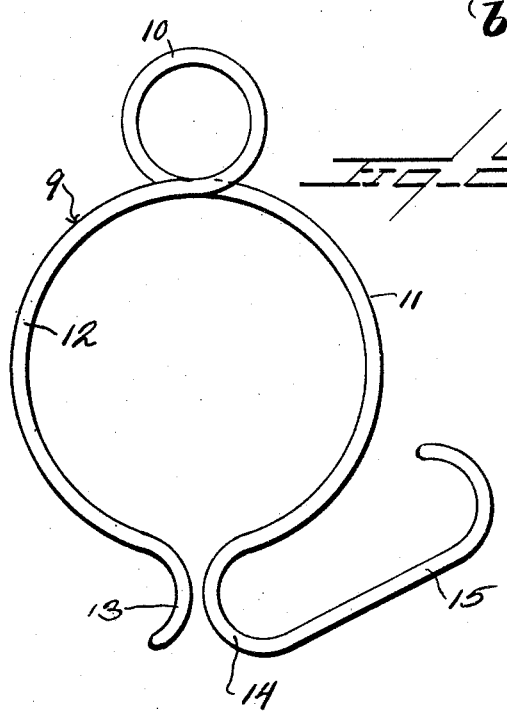
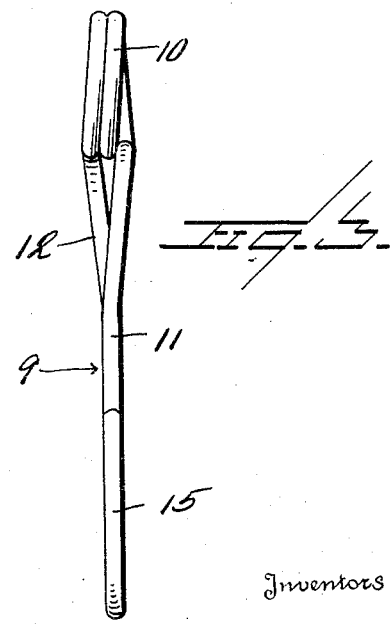
Inventors
*E. C. MacDonald*
*F. E. Miles*
By *Watson E. Coleman*
Attorney Patented June 6, 1933

1,912,587

UNITED STATES PATENT OFFICE

EVAN C. MacDONALD, OF MONTROSE, AND FRED E. MILES, OF FLINT, MICHIGAN

TIRE CLAMP

Application filed June 7, 1932. Serial No. 615,926.

This invention relates to clamps adapted to be temporarily disposed upon a pneumatic tire for the purpose of compressing the tire and allowing it to be slipped off of the rim or put on the rim more easily than otherwise would be the case, the clamp being particularly adapted for use with what are known as drop center tires.

Our invention is illustrated in the accompanying drawing, wherein:—

Figure 1 is a sectional view of a "drop center" ring and tire and showing in elevation one of my clamps applied thereto before deflation of the tire;

Figure 2 is an elevation of one of the clamps in its natural state;

Figure 3 is an edge elevation of the clamp shown in Figure 2.

Referring to the drawing, it will be seen that the clamp consists of a single length of heavy metal rod designated generally 9. This rod is coiled approximately intermediate its ends to form the two or more spring coils 10. The rod is bent on each side of said coils to form the two curved arms 11 and 12. The arm 12 at its extremity is outwardly turned slightly as at 13.

The arm 11 is outwardly turned as at 14 and then extends upward and outward and then inward and slightly downward to form a handle 15. We have shown this clamp as applied to a drop center tire wherein the tire is designated A, the inner tube $a$, the rim B having the two seats $b$ and $b'$, the seats $b$ supporting the beads of the tire or casing A and the seat $b$ supporting the middle portion of the inner tube $a$.

By placing two of these clamps 6 or 7 inches apart, one on each side of the tire valve, the clamps compress the tire, allowing it to drop into the center of a drop center rim, making it easy to slip the tire off with any small bar, lever or pry. When putting the tire in place, three clamps are used, two of the clamps being placed in the same position as for taking the tire off and the other clamp being disposed directly opposite so as to hold the inner tube. The casing and inner tube are then slid on to the wheel with the valve on top and the tire pressed on with a small tire bar. In putting on or off drop center tires, one of the great difficulties is that the beads of the tires become broken which is caused by not getting the beads down into the drop center before prying them off and by using a long pry or lever which breaks the wire inside of the bead. This is entirely eliminated with our construction.

As before stated, three of these clamps will be used in a set, two being used for removing the tire and three being used in putting the tire in place. By engaging one end of the clamp over the tire, and then pulling on the portion 15, the clamp may be readily engaged over the tire in clamping position.

It is to be understood, of course, that these clamps can only be used on deflated tires as if it was attempted to take off an inflated tire the inner tube would be lost. Where a flat tire occurs with a drop center wheel, it is nearly impossible to take the tire off unless there is provided some kind of a clamp to force the beads of the tire in to permit the tire to drop even with the outside circumference of the wheel. A small bar is then used to pry the tire off. By using the two clamps, one on each side of the valve, more space is provided to permit the shoe to drop into the middle recess. When putting on a tire, a third clamp is merely used for the protection of the inner tube so that it will not cut on the wheel.

We claim:—

1. A tire clamp comprising a single length of resiliently contractible heavy gage metal, the clamp being U-shaped to embrace the tire and having at one end an outwardly and upwardly extending handle.

2. A tire clamp comprising a single length of heavy gage resilient wire, the middle portion being coiled and the wire on each side of the coil being formed to provide two clamping arms, concavely curved with relation to each other to embrace a tire, one of said clamping arms having its extremity turned slightly outward, the other clamping arm being extended downward, upward and then slightly inward to constitute a handle.

3. A tire clamp comprising a single length of heavy gage resiliently contractible metal, the middle portion of the length being coiled, and the material on each side of the coil being formed to provide two clamping arms concavely curved with relation to each other to embrace a tire, one of said clamping arms having its extremity turned outward and upward to constitute a handle whereby the clamp may be opened.

In testimony whereof we hereunto affix our signatures.

EVAN C. MacDONALD.
FRED E. MILES.